UNITED STATES PATENT OFFICE.

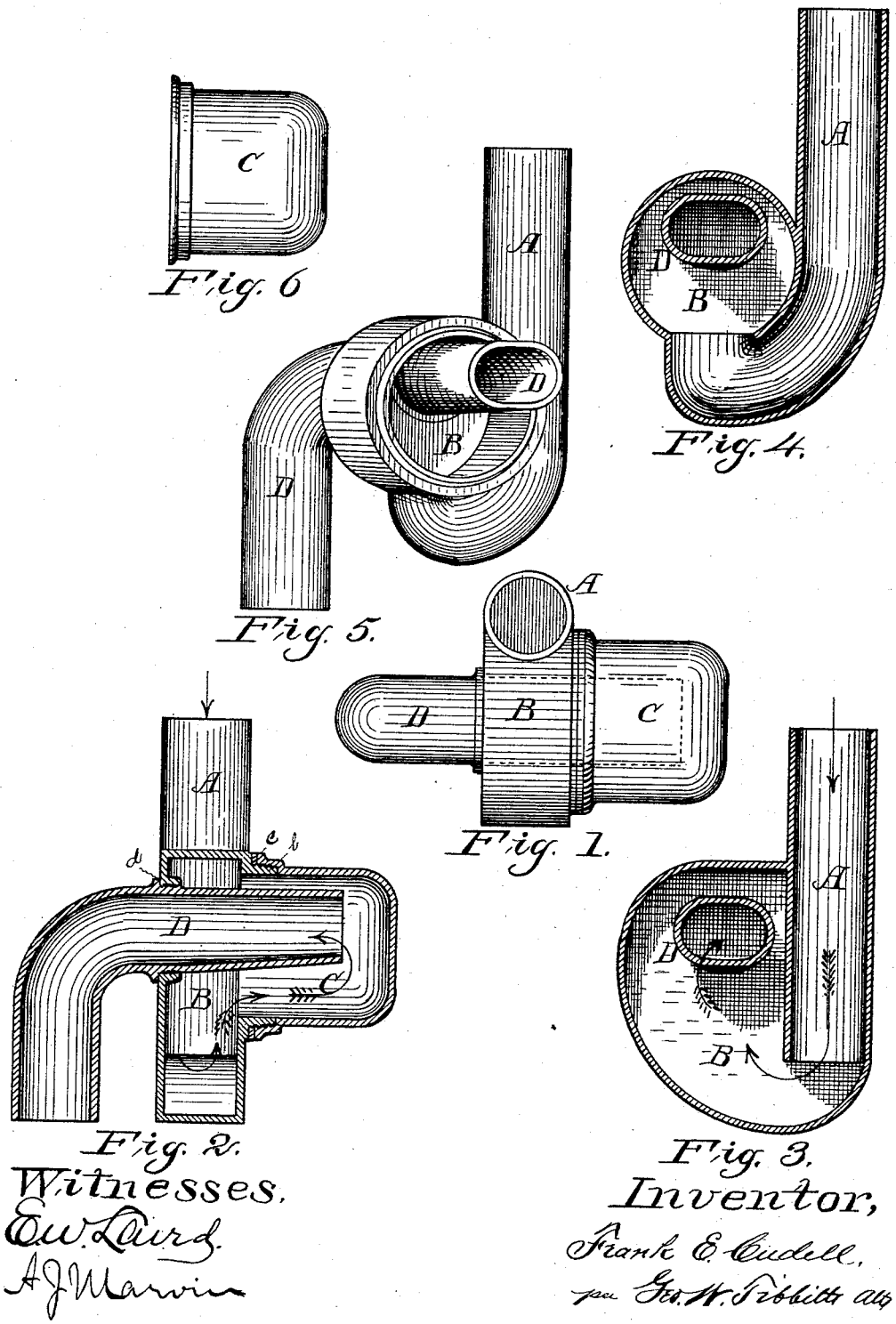

FRANK E. CUDELL, OF CLEVELAND, OHIO.

SEWER-GAS TRAP.

SPECIFICATION forming part of Letters Patent No. 348,829, dated September 7, 1886.

Application filed March 1, 1886. Serial No. 193,671. (No model.)

*To all whom it may concern:*

Be it known that I, FRANK E. CUDELL, of Cleveland, in the county of Cuyahoga and State of Ohio, have invented certain new and useful Improvements in Sewer-Gas Traps, of which the following is a specification.

This invention relates to traps for the prevention of the escape of sewer-gases, and has for its object to provide a non-siphoning trap, and one which can be easily opened for access to the interior.

The invention consists in the combination, with the inlet-pipe, of a perpendicular chamber, into the bottom of which the inlet-pipe discharges, and a second or side chamber consisting of a cup removably attached to one side of said first or main chamber, and an outlet-pipe leading horizontally out from the upper part of said side chamber and through the opposite wall of said first chamber.

In the accompanying drawings, Figure 1 is a top or plan view of the trap. Fig. 2 is a vertical section. Fig. 3 is a transverse vertical section. Fig. 4 is a vertical section like Fig. 3, in modified form. Fig. 5 is a perspective view of the trap having cup removed to show entrance to outlet-pipe. Fig. 6 is the cup removed.

A is the inlet-pipe, to which is attached a perpendicular chamber, B, the discharge from said inlet-pipe being in the lower part or bottom of said chamber.

C is a side or sub chamber, consisting of a cup provided with a screw-threaded rim, c, by which it is secured to one side of the first or main chamber, B, the side wall of said chamber having a screw-threaded flange, b, for that purpose.

D is an outlet-pipe, placed horizontally in the upper part of the two chambers B and C, the open end of which is located in the end of second chamber, C. The pipe D is secured in the wall of chamber B by means of a screw-thread, d; or it may be soldered fast, if desired. The outer portion of said pipe D may be bent to lead downward, as shown, or in any desired direction.

The course of the water through this trap, as indicated by the arrows, is first into the bottom of the main or first chamber, B, thence upward and around through the side chamber, C, into the open end of outlet-pipe D. The circuitous course thus taken by the water precludes the liability of the trap being emptied by siphoning. The advantages in this construction of the trap are readily seen to be that in case of clogging or becoming foul the cup C can be easily removed, thus leaving the interior of the trap accessible for inspection and cleaning and the open end of outlet-pipe exposed for convenience of attaching a force-pump for flushing or washing it out.

In Fig. 4 is shown a modification in attaching the inlet-pipe to the chamber B by curving the pipe to lead into the bottom; but the form shown in Fig. 2 is preferable, as being easier to construct.

I claim—

The vertical inlet-pipe A, having vertical chamber B, attached on one side with communication at its bottom with said pipe A, and having side chamber, C, having the outlet-pipe D, extending inwardly to communicate with said side chamber and leading out through the opposite side wall of chamber B, as shown and described.

F. E. CUDELL.

Witnesses:
 GEO. W. TIBBITTS,
 E. W. LAIRD.